US012583575B2

(12) United States Patent　　　　　(10) Patent No.:　　US 12,583,575 B2
Schlipf et al.　　　　　　　　　　　　　(45) Date of Patent:　　　Mar. 24, 2026

(54) WING FOR AN AIRCRAFT

(71) Applicant: Airbus Operations GmbH, Hamburg
　　　　　　　(DE)

(72) Inventors: Bernhard Schlipf, Hamburg (DE); **Jan
　　　　　　Haunert**, Hamburg (DE)

(73) Assignee: AIRBUS OPERATIONS GMBH,
　　　　　　　Hamburg (DE)

( * ) Notice:　Subject to any disclaimer, the term of this
　　　　　　patent is extended or adjusted under 35
　　　　　　U.S.C. 154(b) by 0 days.

(21) Appl. No.: 18/765,129

(22) Filed:　　Jul. 5, 2024

(65)　　　　　Prior Publication Data

US 2025/0019064 A1　　　Jan. 16, 2025

(30)　　　　Foreign Application Priority Data

Jul. 12, 2023　(EP) ..................................... 23185091

(51) Int. Cl.
　　*B64C 13/26*　　　　(2006.01)
　　*B64C 9/02*　　　　(2006.01)
　　*B64C 9/24*　　　　(2006.01)
(52) U.S. Cl.
　　CPC ................... *B64C 9/24* (2013.01); *B64C 9/02*
　　　　　　(2013.01); *B64C 13/26* (2013.01)
(58) Field of Classification Search
　　CPC .............. B64C 9/02; B64C 9/24; B64C 13/26
　　See application file for complete search history.

(56)　　　　　References Cited

U.S. PATENT DOCUMENTS

| | | | | |
|---|---|---|---|---|
| 5,681,013 | A | * 10/1997 | Rudolph | ................... B64C 9/24 |
| | | | | 244/214 |
| 10,919,616 | B2 | * 2/2021 | Vervliet | .................... B64C 9/02 |
| 2020/0023937 | A1 | * 1/2020 | Everaert | .................. B64C 5/10 |
| 2021/0163121 | A1 | * 6/2021 | Schlipf | .................... B64C 3/50 |
| 2022/0388629 | A1 | * 12/2022 | Schlipf | .................. B64C 13/28 |

FOREIGN PATENT DOCUMENTS

| | | |
|---|---|---|
| EP | 0781704 A1 | 7/1997 |
| EP | 3501977 A1 | 6/2019 |
| GB | 1572004 A | 7/1980 |
| WO | 2018197649 A1 | 11/2018 |

OTHER PUBLICATIONS

Extended European Search Report for EP Application No. 23185091,
dated Dec. 18, 2023, 7 pages.

* cited by examiner

*Primary Examiner* — Tye William Abell
(74) *Attorney, Agent, or Firm* — Nixon & Vanderhye P.C.

(57)　　　　　ABSTRACT

An aircraft wing (3) including a main wing (5), a slat (7), and
a connection assembly (9) movably connecting the slat (7)
to the main wing (5). The connection assembly (9) includes
an elongate slat track (17) extending along a track longitu-
dinal axis (19) having a front end (21) an intermediate
portion (25) and a rear end (23). The front end (21) and/or
the intermediate portion (25) is mounted to the slat (7). The
rear end (23) and/or the intermediate portion (25) is mounted
to the main wing (5) by a roller bearing (27). The roller
bearing (27) includes a guide rail (29) mounted to the main
wing (5) and a first roller unit (31) mounted to the rear end
(23) of the slat track (17) and engaging the guide rail (29),
and wherein the guide rail (29) includes an upper rail portion
(32) and a lower rail portion (34).

15 Claims, 5 Drawing Sheets

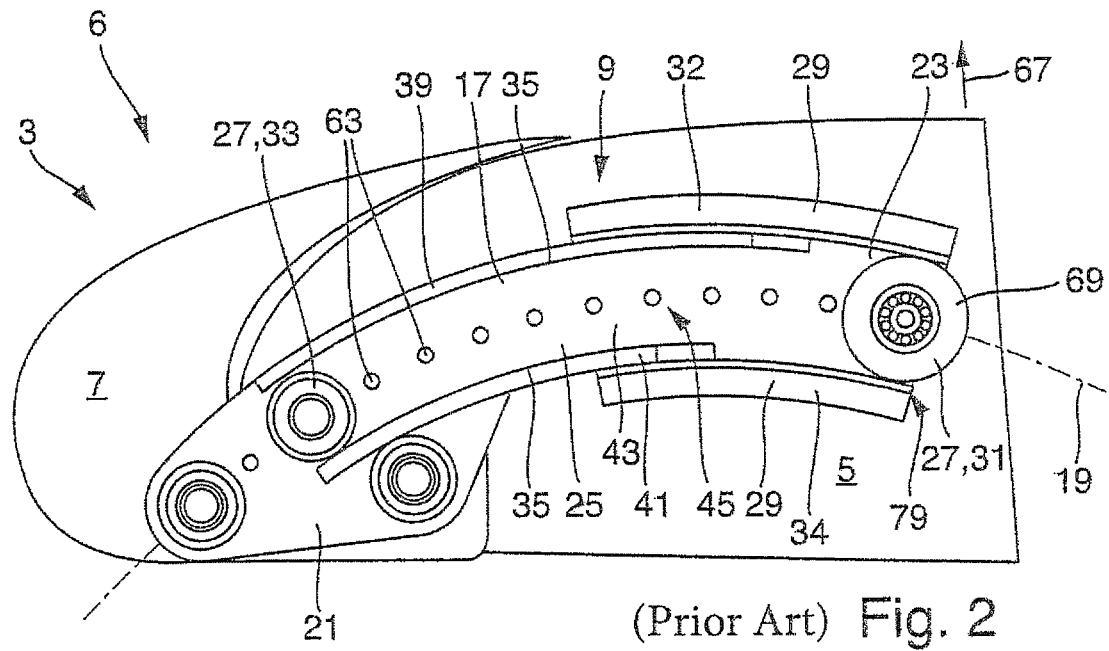
(Prior Art) Fig. 2
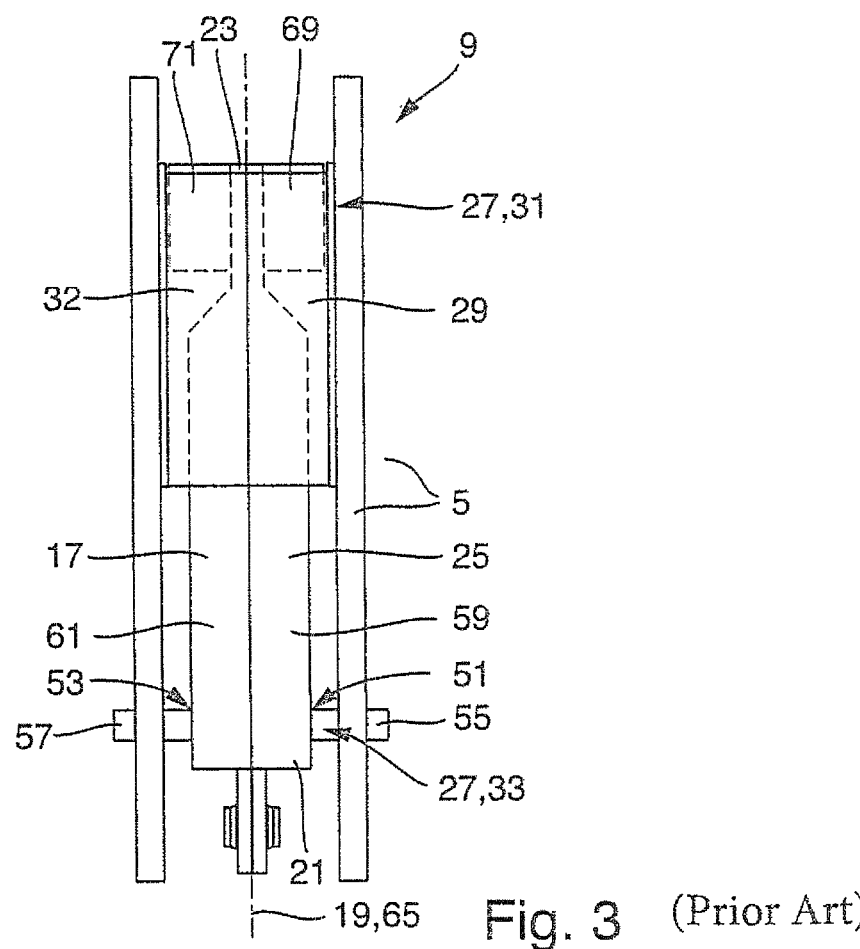
Fig. 3    (Prior Art)

WING FOR AN AIRCRAFT

RELATED APPLICATION

This application incorporates by reference and claims priority to European patent application EP 23185091.8, filed Jul. 12, 2023.

TECHNICAL FIELD

The present invention relates to a wing for an aircraft. Further aspects of the invention relate to a leading edge high lift assembly for such a wing, as well as to an aircraft comprising such a wing and/or such a leading edge high lift assembly.

BACKGROUND

The wing comprises a main wing and a leading edge high lift assembly. The leading edge high lift assembly comprises a slat and a connection assembly movably connecting the slat to the main wing, such that the slat is movable between a retracted position and at least one extended position.

The connection assembly comprises an elongate slat track that extends along a track longitudinal axis in a curved or straight manner between a front end and a rear end and has an intermediate portion between the front and rear ends. The front end and/or the intermediate portion of the slat track may be fixedly mounted to the slat, e.g. by two spherical bearings, both arranged with an offset in a wing profile plane across a wing span direction. The rear end and/or the intermediate portion of the slat track are movably mounted to the main wing by a roller bearing such that the slat track is movable along the track longitudinal axis, e.g., along a predefined path or circular path.

The roller bearing comprises a guide rail may be fixedly mounted to the main wing and a first roller unit mounted to the rear end of the slat track and engaging the guide rail. The guide rail may be formed such that its surfaces lie opposite the circumferential surface of the first roller unit, wherein the distance between an upper surface and a lower surface of the guide rail is larger than a diameter of the first roller unit, so that the first roller unit may engage only either the upper surface or the lower surface of the guide rail at the same time. I.e., the distance between upper and lower surfaces of the guide rail is selected such that a clearance is provided between the first roller unit and either the upper surface or the lower surface of the guide rail, so that the first roller unit cannot engage with the upper and lower surfaces of the guide rail at the same time and thereby block the first roller unit. Further, the first roller unit may have a first axis of rotation extending in parallel to a wing span direction, to a leading edge of main wing, or to a leading edge of the slat. The guide rail comprises an upper rail portion for engagement with the first roller unit from above, such as extending above the slat track, and a lower rail portion for engagement with the first roller unit from below such as extending below the slat track.

Such wings are known in the art, for example from WO 2018/197649 A1, where the connections assembly comprises a guide rail having a C-shaped cross section including an upper rail portion and a lower rail portion extending in a continuous manner above and below the upper and lower sides of the slat track, thereby making wide parts of the upper and lower side of the slat track inaccessible for engagement with an actuation device.

SUMMARY

The present invention may be embodied to provide a wing that enables efficient and flexible actuation of the slat track by an actuation device.

The present invention may be embodied as a guide rail including a longitudinal slot in the upper rail portion and/or in the lower rail portion. The slot extends in the longitudinal direction of the slat track, such as parallel to the track longitudinal axis, and might be narrow or might be in the form of a wider gap. The slot is configured for receiving an actuation device of part of it. In such a way, the slot enables an actuation device to reach through it and thus project through the upper rail portion and/or the lower rail portion when the slat track and slat is moved between the retracted position and the at least one extended position. The guide rail therefore does not form an obstacle any more for engagement of the slat track by an actuation device from above or below.

According to an embodiment, the slot is throughgoing from a front end to a rear end of the guide rail. In such a way, movement of the actuation unit along the entire guide rail is possible.

According to another embodiment, the guide rail comprises a first rail part arranged at a first side of the slat track and a second rail part arranged at a second side of the slat track. The slot extends between the first rail part and the second rail part, i.e. forming the border between the first rail part and the second rail part. In such a way, an efficient form of the guide rail is provided that allows simple installation and reliable guiding.

The guide rail may comprise an upper slot in the upper rail portion and a lower slot in the lower rail portion. The upper slot and the lower slot are throughgoing from the front end to the rear end of the guide rail, so that the first rail part and the second rail part are formed separately, separated by the upper and lower slots. In such a way, both rail parts can be provided, mounted, maintained and exchanged individually separate from one another.

The first rail part and/or the second rail part may have a C-shaped cross section, when viewed across the track longitudinal axis, including the upper rail portion that may be formed as an upper flange, the lower rail portion may be formed as a lower flange, and a side portion that may be formed as a web and connecting the upper rail portion to the lower rail portion. The C-shape may be arranged such that it is concave with respect to the slat track. The side portion may form or include a guide for one or more lateral slide pads provided at the slat track for lateral guiding of the slat track along the guide rail. By such a shape a very simple, efficient and reliable guide rail design is provided.

The connection assembly may comprise an actuation device mounted to the main wing and engaging the slat track for moving the slat track and the slat between the retracted position and the at least one extended position. The actuation device may reach through the slot when engaging the slat track. In such a way, the actuation unit is not obstructed by the guide rail when moving the slat track between the retracted position and the at least one extended position.

The actuation device may comprise a rotating drive arm that may be mounted to the main wing and that is rotatably driven about a drive axis and is mounted to the slat track such as in a rotatable manner. The drive arm may reach through the slot when the drive arm moves the slat track along the guide rail. In such a way, the drive arm can freely move without being obstructed by the guide rail during actuation of the slat track.

The drive arm may reach through the slot in the lower rail portion. The slat track may be curved having a concave form with respect to the drive arm. In such a way, the drive arm may actuate the slat track for movement along a curved path.

The actuation unit may comprises a rack-and-pinion drive including a pinion that may be mounted to the main wing and that is rotatably driven and engages a toothed rack provided at the slat track. The pinion may reach through the slot, while the slot may be arranged in the lower rail portion. In such a way, the pinion can freely rotate without being obstructed by the guide rail during actuation of the slat track.

The roller bearing may comprise a second roller unit that may be fixedly mounted to the main wing and that engages an engagement surface provided at the intermediate portion of the slat track. The second roller unit may have a second axis of rotation extending in parallel to the wing span direction, to the leading edge of main wing, or to the leading edge of the slat. By such a second roller unit the slat track can be efficiently and reliably supported and guided during movement between the retracted position and the at least one extended position.

The slat track may have a profile, i.e. a cross section across the track longitudinal axis, comprising an upper flange portion, a lower flange portion and at least one web portion connecting upper and lower flange portions. Such a profile might be e.g. a C-profile, a double-C-profile, an I-profile, an H-profile, or a π-profile. The second roller unit may be arranged in a recess between upper and lower flange portions and engages the engagement surface provided at the upper flange portion and/or at the lower flange portion, such as either the upper flange portion or the lower flange portion or both flange portions in a successive manner. In such a way, the second roller unit does not occupy the space above and below the slat track, and the slat track can be held with only a single roller element. This simplifies the connection assembly, saves space and weight, and thus increases efficiency of the wing. Further, the connection assembly can be formed such that it is arranged entirely in front of the front spar of the associated wing and does not penetrate the front spar.

The slat track may have an I-profile or double-C-profile, that a first recess is formed between the upper and lower flange portions at a first side of the web portion, and a second recess is formed between the upper and lower flange portions at a second side of the web portion opposite the first side. In such a way, two roller elements can be received in both recesses.

The second roller unit may comprise a first roller element and a second roller element. The first roller element is arranged in the first recess and the second roller element is arranged in the second recess. First and second roller elements may be arranged coaxially, with both rotating about the second axis of rotation and having the same radius. By the first and second roller element higher loads can be absorbed and a symmetric arrangement or an arrangement with two separate main load paths is enabled.

The first roller unit may comprise a third roller element and a fourth roller element. Third and fourth roller elements are arranged coaxially, i.e. both rotating about the first axis of rotation, and have the same radius. The third roller element may be arranged at the first side and the fourth roller element is arranged at the second side of the web portion. In such a way, by the third and fourth roller elements two separate main load paths are provided. Alternatively, the first roller unit might also comprise only a single third roller element.

The third roller element may engage with the first rail part and/or the fourth roller element engages with the second rail part. In such a way, two individual main load paths are provided.

The slat track may comprise a first track part and a second track part that are formed separate from one another. Each of the first and second track parts is formed integrally and extends along the track longitudinal axis from the rear end to the front end. The first and second track parts are mounted to one another, e.g. by bolts, and rest against one another along a contact plane spanned by the track longitudinal axis and a wing thickness direction, which might be a vertical symmetry plane, such as along the entire longitudinal extension. By the first and second track part two separate main load paths are introduced which might be designed as redundant main load paths such that when one load path fails the other load path is still capable of carrying the occurring air loads applied via the slat.

The third roller element may be mounted to the first track part and the fourth roller element is mounted to the second track part. In such a way, in case of failure of one of the first and second track portions the other one of the first and second track portions would still be guided by the associated one of the third and fourth rollers. Alternatively, in case of a single third roller element this might be mounted to both the first track part and the second track part.

The connection assembly may be a first connection assembly. The wing comprises a second connection assembly connecting the slat to the main wing in a position spaces apart from the first connection assembly in a wing span direction. The second connection assembly may be formed as the first connection assembly, that may have the same features as the first connection assembly. Alternatively, the second connections assembly might also be formed different from the first connection assembly.

The invention may be embodied as a leading edge high lift assembly for a wing according to any of the embodiments described above. The leading edge high lift assembly comprises a slat and a connection assembly for movably connecting the slat to a main wing for an aircraft, such that the slat is movable between a retracted position and at least one extended position. The connection assembly comprises an elongate slat track that extends along a track longitudinal axis between a front end and a rear end and has an intermediate portion between the front and rear ends. The front end and/or the intermediate portion of the slat track is configured to be mounted to the slat. The rear end and/or the intermediate portion of the slat track are configured to be mounted to the main wing by a roller bearing such that the slat track is movable along the track longitudinal axis. The roller bearing comprises a guide rail configured to be mounted to the main wing, and a first roller unit mounted to the rear end of the slat track and configured for engaging the guide rail. The guide rail comprises an upper rail portion and a lower rail portion. The guide rail comprises a longitudinal slot in the upper rail portion and/or in the lower rail portion. The features and advantages mentioned above in connection with the wing apply vis-n-vis also for the leading edge high lift assembly.

The invention may be embodied as an aircraft comprising the wing according to any of the embodiments described above and/or comprising the leading edge high lift assembly according to any of the embodiments described above. The features and advantages mentioned above in connection with the wing and the leading edge high lift assembly apply vis-n-vis also for the aircraft.

SUMMARY OF DRAWINGS

Hereinafter, an embodiment(s) of the present invention is described in more detail by means of a drawing identified below:

FIG. 2 is a cross sectional view of a wing according to the prior art, including a connection assembly, FIG. 3 is a top view of the connection assembly shown in FIG. 2.

DETAILED DESCRIPTION

Figure 1:
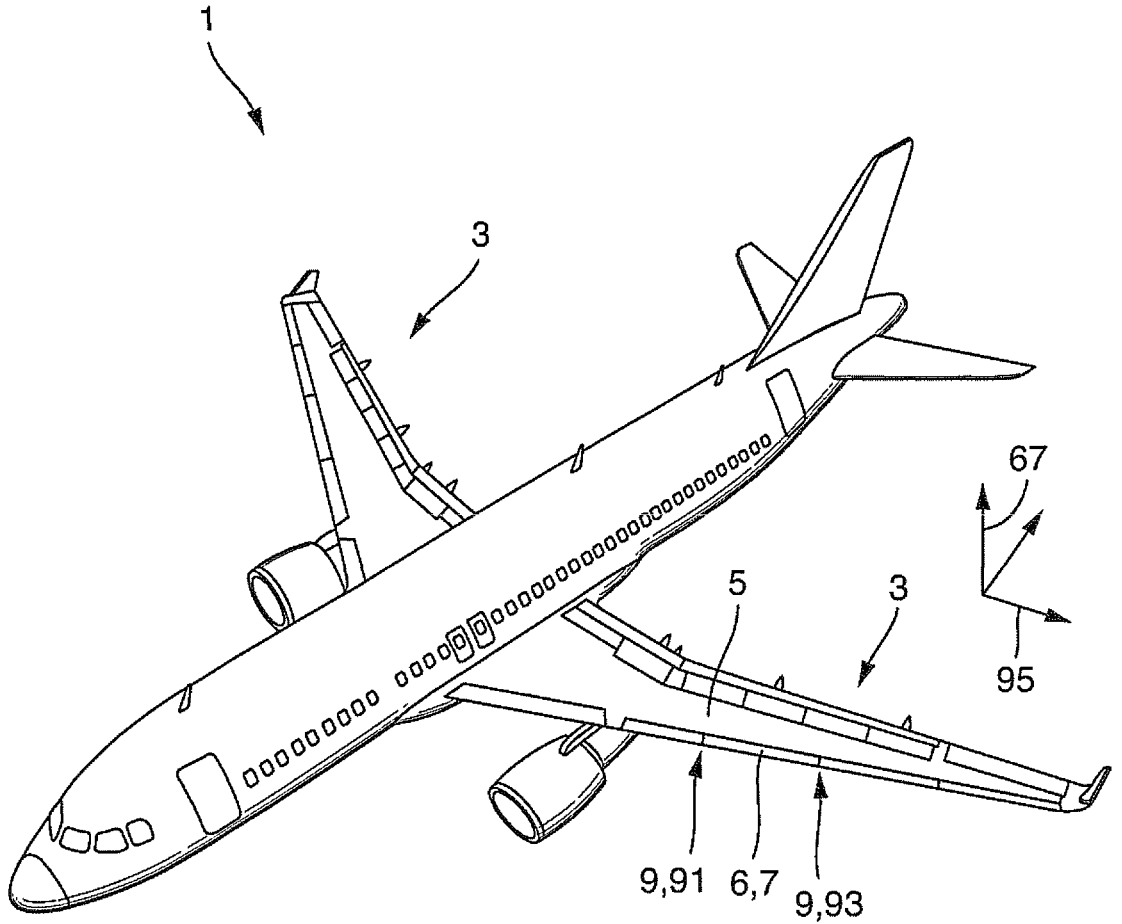
FIG. 1 is a perspective view of an aircraft according to an embodiment of the present invention.

In FIG. 1 an aircraft 1 according to an embodiment of the present invention is illustrated. The aircraft 1 comprises a wing 3 that is formed according to an embodiment of the present invention.

FIG. 2 shows a wing 3 as known from the prior art in more detail. The wing 3 comprises a main wing 5 and a leading edge high lift assembly 6. The leading edge high lift assembly 6 comprises a slat 7 and a connection assembly 9 movably connecting the slat 7 to the main wing 5, such that the slat 7 is movable between a retracted position and at least one extended position.

Figure 4:
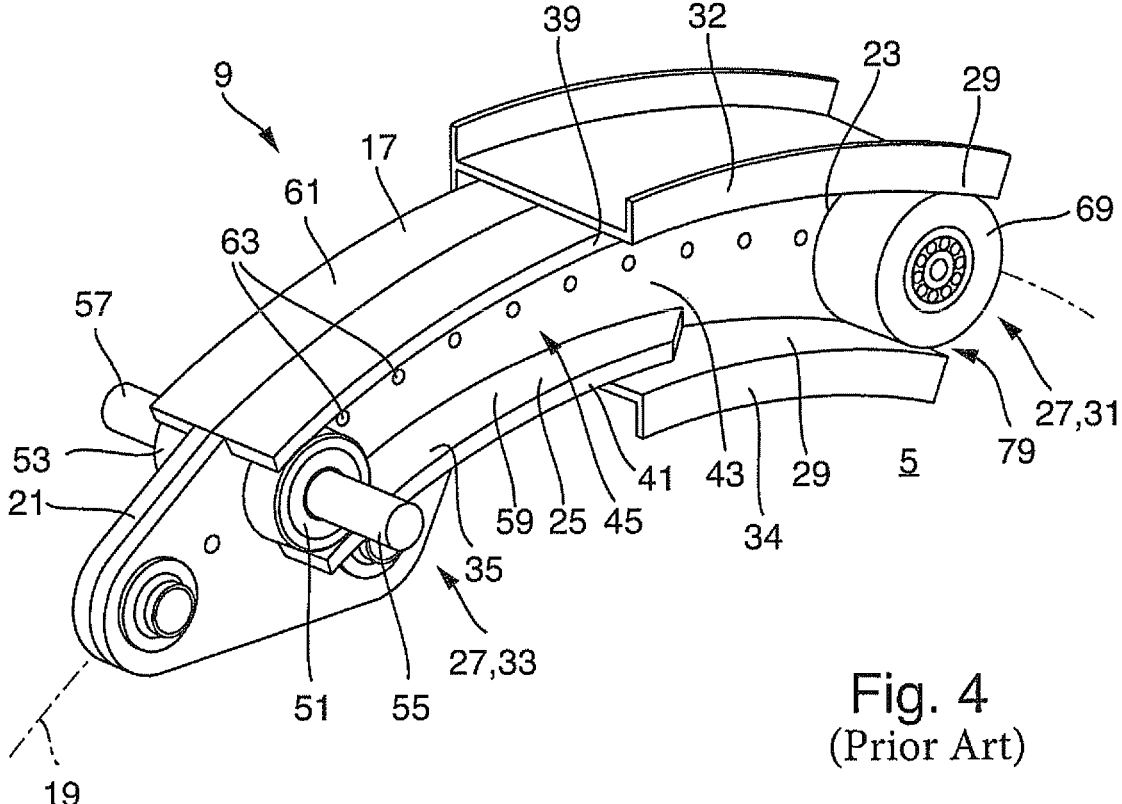
FIG. 4 is a perspective view of the connection assembly shown in FIG. 2.
Figure 5:
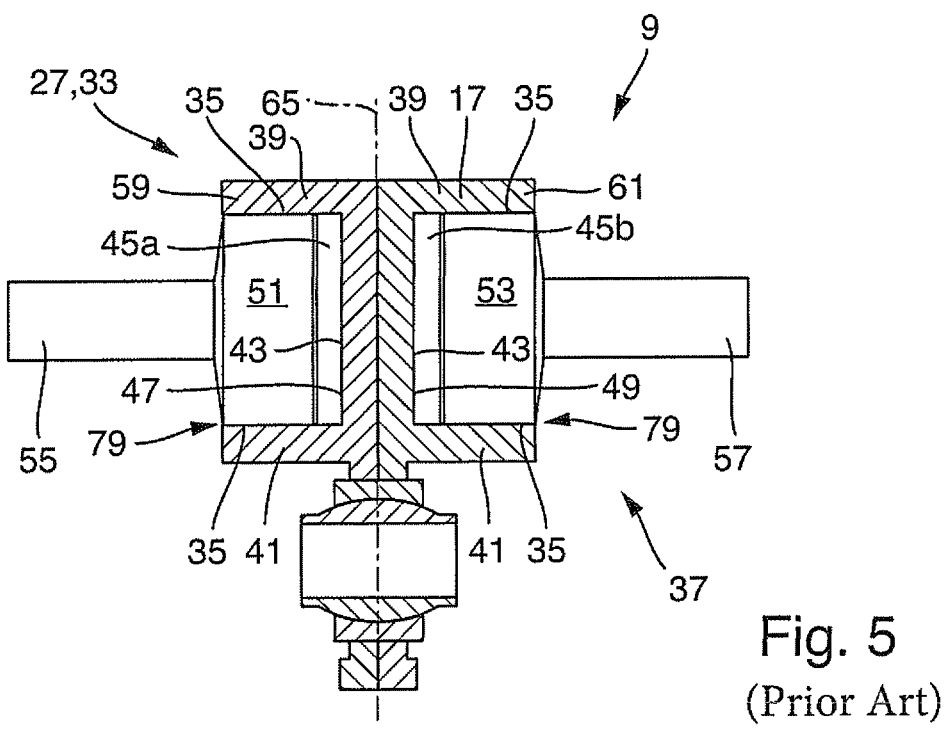
FIG. 5 is a cross sectional view across the track longitudinal axis of the connection assembly shown in FIG. 2.

The connection assembly 9 comprises an elongate slat track 17 that extends along a track longitudinal axis 19 between a front end 21 and a rear end 23 and has an intermediate portion 25 between the front and rear ends 21, 23. The front end 21 of the slat track 17 is fixedly mounted to the slat 7. The rear end 23 and the intermediate portion 25 of the slat track 17 are movably mounted to the main wing 5 by a roller bearing 27 such that the slat track 17 is movable along the track longitudinal axis 19. The roller bearing 27 comprises a guide rail 29 fixedly mounted to the main wing 5 and a first roller unit 31 fixedly mounted to the rear end 23 of the slat track 17 and engaging the guide rail 29. The guide rail 29 comprises an upper rail portion 32 for engagement with the first roller unit 31 from above and extending above the slat track 17, and a lower rail portion 34 for engagement with the first roller unit 31 from below and extending below the slat track 17. The roller bearing 27 further comprises a second roller unit 33 that is fixedly mounted to the main wing 5 and that engages an engagement surface 35 provided at the intermediate portion 25 of the slat track 17. As shown in FIGS. 3 to 5, the slat track 17 has a double-C-shaped profile 37 comprising an upper flange portion 39, a lower flange portion 41 and at least one web portion 43 connecting upper and lower flange portions 39, 41. The second roller unit 33 is arranged in a recess 45 between upper and lower flange portions 39, 41 and engages the engagement surface 35 provided at the upper flange portion 39 and at the lower flange portion 41.

As shown in FIGS. 4 and 5, the double-C-shaped profile 37 of the slat track 17 provides that a first recess 45a is formed between the upper and lower flange portions 39, 41 at a first side 47 of the web portion 43, and a second recess 45b is formed between the upper and lower flange portions 39, 41 at a second side 49 of the web portion 43 opposite the first side 47. The second roller unit 33 comprises a first roller element 51 and a second roller element 53. The first roller element 51 is arranged in the first recess 45a and the second roller element 53 is arranged in the second recess 45b. First and second roller elements 51, 53 are arranged coaxially and have the same radius. The first roller element 51 is mounted on a first shaft 55 and the second roller element 53 is mounted on a second shaft 57 separate from the first shaft 55. First and second shafts 55, 57 are independently supported at the main wing 5.

FIGS. 3 to 5 show that the slat track 17 comprises a first track part 59 and a second track part 61 that are formed separate from one another. Each of the first and second track parts 59, 61 is formed integrally and extends along the track longitudinal axis 19 from the rear end 23 to the front end 21. The first and second track parts 59, 61 are mounted to one another by bolts 63 and rest against one another along a contact plane 65 spanned by the track longitudinal axis 19 and a wing thickness direction 67. As visible in FIG. 3, the first roller unit 31 comprises a third roller element 69 and a fourth roller element 71. Third and fourth roller elements 69, 71 are arranged coaxially and have the same radius. The third roller element 69 is mounted to the first track part 59 and the fourth roller element 71 is mounted to the second track part 61.

Figure 6:
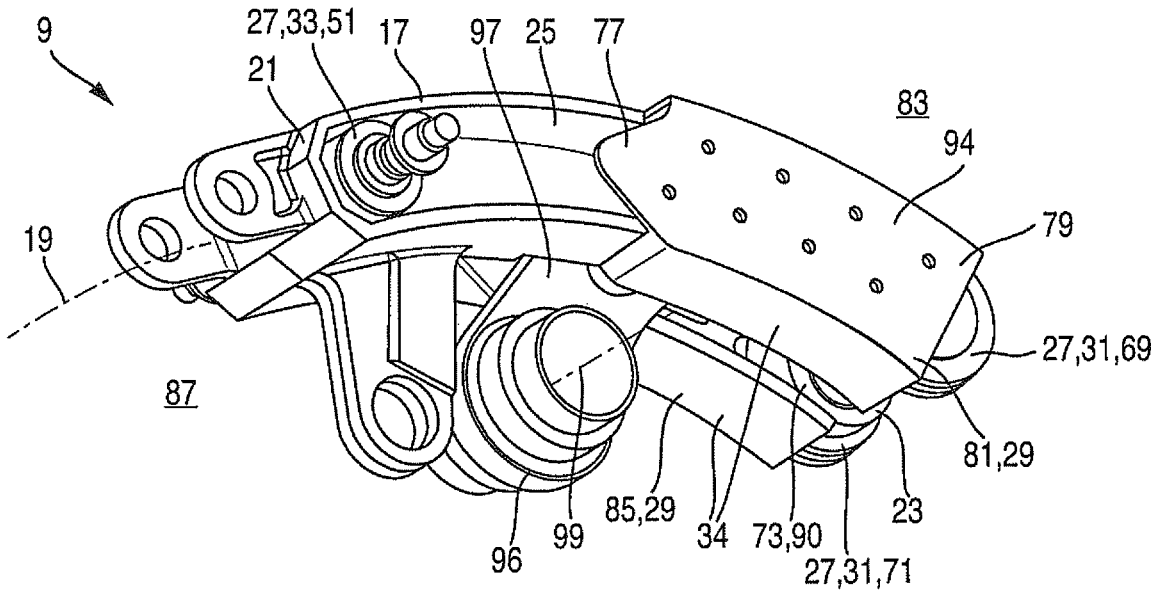
FIG. 6 is a perspective view from below of a connection assembly according to an embodiment of the present invention.
Figure 7:
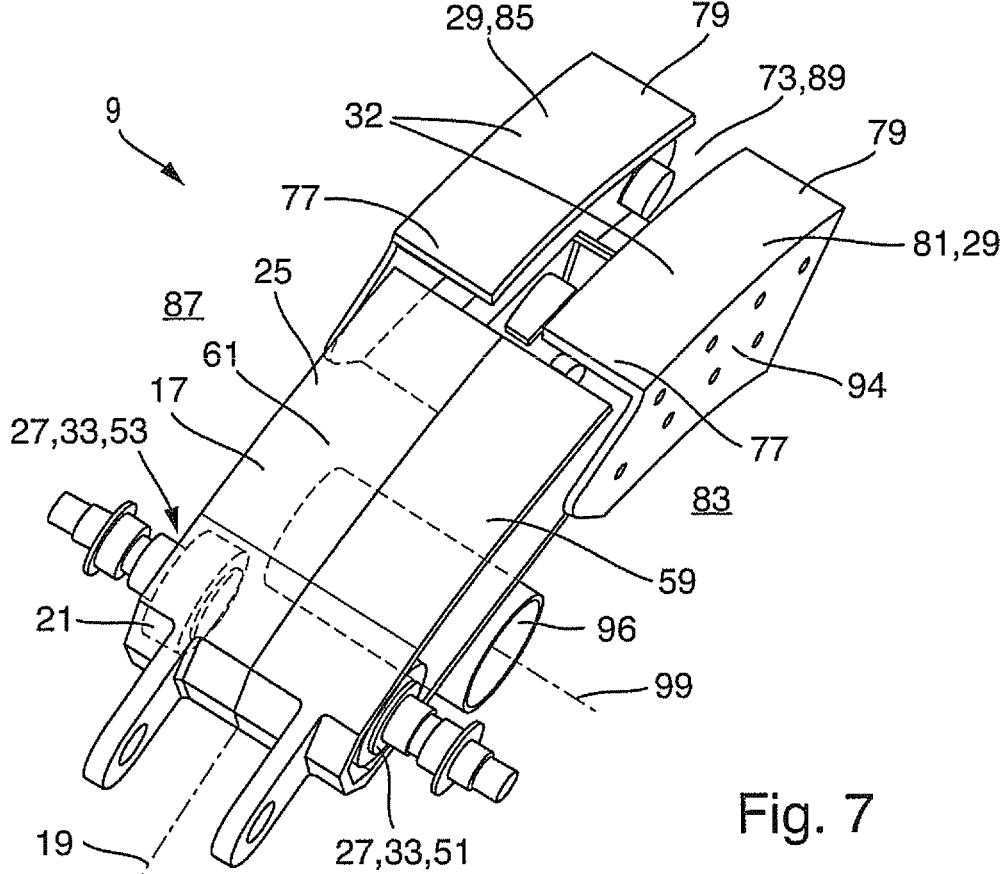
FIG. 7 is a perspective view from above of the connection assembly shown in FIG. 6.

FIGS. 6 and 7 show a connection assembly 9 according to an embodiment of the invention. The connection assembly 9 shown in FIGS. 6 and 7 differs from the prior art connection assembly 9 shown in FIGS. 2 to 5 by the guide rail 29 comprising a longitudinal slot 73 in the upper rail portion 32 and in the lower rail portion 34. The slot 73 extends in the longitudinal direction of the slat track 17 in parallel to the track longitudinal axis 19. Further, the slot 73 is throughgoing from a front end 77 to a rear end 79 of the guide rail 29.

The guide rail 29 comprises a first rail part 81 arranged at a first side 83 of the slat track 17 and a second rail part 85 arranged at a second side 87 of the slat track 17. The slot 73 extends between the first rail part 81 and the second rail part 85, i.e. forming the border between the first rail part 81 and the second rail part 85. As visible in FIGS. 6 and 7, the guide rail 29 comprises an upper slot 89 in the upper rail portion 32 and a lower slot 90 in the lower rail portion 34. The upper slot 89 and the lower slot 90 are throughgoing from the front end 77 to the rear end 79 of the guide rail 29, so that the first rail part 81 and the second rail part 85 are formed separately, separated by the upper and lower slots 89, 90. The first rail part 81 and the second rail part 85 have a C-shaped cross section, when viewed across the track longitudinal axis 19, including the upper rail portion 32 formed as an upper flange, the lower rail portion 34 formed as a lower flange, and a side portion 94 formed as a web connecting the upper rail portion 32 to the lower rail portion 34. The C-shape is arranged such that it is concave with respect to the slat track 17.

As shown in FIG. 6, the connection assembly 9 comprises an actuation device 96 mounted to the main wing 5 and engaging the slat track 17 for moving the slat track 17 and the slat 7 between the retracted position and the at least one extended position. The actuation device 96 reaches through the slot 73 when engaging the slat track 17. In the present embodiment, the actuation device 96 comprises a rotating drive arm 97 that is mounted to the main wing 5 and that is rotatably driven about a drive axis 99 and is mounted to the slat track 17 in a rotatable manner. The drive arm 97 reaches through the slot 73 when the drive arm 97 moves the slat track 17 along the guide rail 29. In the present embodiment, the drive arm 97 reaches through the slot 73 in the lower rail portion 34. The slat track 17 is curved having a concave form with respect to the drive arm 97.

As shown in FIG. 1, the connection assembly 9 is a first connection assembly 91, and the wing 3 comprises a second connection assembly 93 connecting the slat 7 to the main wing 5 in a position spaced apart from the first connection assembly 91 in a wing span direction 95, and wherein the second connection assembly 93 is formed as the first connection assembly 91.

By the present invention as described above, the slot 73 enables an actuation device 96 to reach through it and thus project through the upper rail portion 32 and/or the lower rail portion 34 when the slat track 17 and slat 7 is moved between the retracted position and the at least one extended position. The guide rail 29 therefore does not form an obstacle any more for engagement of the slat track 17 by an actuation device 96 from above or below.

An aircraft wing 3 including a main wing 5, a leading edge high lift assembly having a slat 7, and a connection assembly 9 movably connecting the slat 7 to the main wing 5, such that the slat 7 is movable between a retracted position and an extended position. The connection assembly 9 includes an elongate slat track 17 extending along a track longitudinal axis 19 between a front end 21 and a rear end 23, and has an intermediate portion 25 between the front and rear ends 21, 23. The front end 21 and/or the intermediate portion 25 is mounted to the slat 7, wherein the rear end 23 and/or the intermediate portion 25 of the slat track 17 are mounted to the main wing 5 by a roller bearing 27 such that the slat track 17 is movable along the track longitudinal axis 19, wherein the roller bearing 27 comprises a guide rail 29 mounted to the main wing 5 and a first roller unit 31 mounted to the rear end 23 of the slat track 17 and engaging the guide rail 29, and wherein the guide rail 29 comprises an upper rail portion 32 and a lower rail portion 34. A wing 3 that embodies the invention enables efficient and flexible actuation of the slat track 17 by an actuation device 96, is achieved in that the guide rail 29 comprises a longitudinal slot 73 in the upper rail portion 32 and/or in the lower rail portion 34.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the disclosure states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, the wing including:

a main wing, and a leading edge high lift assembly including:

a slat, and a connection assembly movably connecting the slat to the main wing, such that the slat is movable between a retracted position and at least one extended position, wherein the connection assembly comprises an elongate slat track that extends along a track longitudinal axis between a front end and a rear end and has an intermediate portion between the front and rear ends, wherein the front end and/or the intermediate portion of the elongate slat track is mounted to the slat, wherein the rear end and/or the intermediate portion of the elongate slat track is mounted to the main wing by a roller bearing such that the elongate slat track is movable along the track longitudinal axis, wherein the roller bearing engage a guide rail mounted to the main wing and the roller bearing includes a first roller bearing unit mounted to the rear end of the elongate slat track and engaging the guide rail, wherein the guide rail comprises an upper rail portion over an upper portion of the elongate slat track and a lower rail portion underneath a lower portion of the slat track, wherein the guide rail comprises a longitudinal slot in the upper rail portion and/or in the lower rail portion, wherein the connection assembly comprises an actuation device mounted to the main wing and attached to the elongate slat track, wherein the actuation device is configured to move the elongate slat track and the slat between the retracted position and the at least one extended position, and wherein the actuation device extends into the longitudinal slot to rotatably attach to the slat track.

2. The wing according to claim 1, wherein the longitudinal slot is throughgoing from a front end to a rear end of the guide rail.

3. The wing according to claim 1, wherein the roller bearing comprises a second roller unit that is mounted to the main wing and that engages an engagement surface provided at the intermediate portion of the elongate slat track, wherein the upper portion of the elongate slat track includes an upper flange portion, the lower portion of the elongate slat track includes a lower flange portion, and the elongate slat track includes at least one web portion connecting the upper flange portion and the lower flange portion, wherein the second roller unit engages the engagement surface provided at the upper flange portion and/or at the lower flange portion, wherein the elongate slat track has a first recess between the upper flange portion and the lower flange portion adjacent a first side of the web portion, and a second recess between the upper flange portion and the lower flange portion adjacent a second side of the web portion opposite the first side, wherein the second roller unit comprises a first roller element and a second roller element, wherein the first roller element is arranged in the first recess and the second roller element is arranged in the second recess, and wherein the first roller element and the second roller element are arranged coaxially and have a common radius.

4. The wing according to claim 1, wherein the actuation device comprises a rotating drive arm that is rotatably driven about a drive axis and that is mounted to the elongate slat track, and wherein the drive arm reaches through the longitudinal slot.

5. The wing according to claim 4, wherein the drive arm reaches through the longitudinal slot in the lower rail portion.

6. The wing according to claim 1, wherein the guide rail comprises a first rail part arranged at a first side of the elongate slat track and a second rail part arranged at a second side of the elongate slat track, and wherein the longitudinal slot extends between the first rail part and the second rail part.

7. The wing according to claim 6, wherein the longitudinal slot includes an upper slot in the upper rail portion of the guide rail and a lower slot in the lower rail portion of the guide rail, and wherein the upper slot and the lower slot are throughgoing from the front end to the rear end of the guide rail.

8. The wing according to claim 6, wherein the first rail part and/or the second rail part have a C-shaped cross section including the upper rail portion, the lower rail portion, and a side portion connecting the upper rail portion and the lower rail portion.

9. The wing according to claim 1, wherein the first roller unit comprises a third roller element and a fourth roller element, wherein the third roller element and the fourth roller element are arranged coaxially and have a common radius.

10. The wing according to claim 9, wherein the third roller element engages with the first rail part and/or the fourth roller element engages with the second rail part.

11. The wing according to claim 9, wherein the elongate slat track comprises a first track part and a second track part that are formed separate from one another, wherein each of the first and second track parts is formed integrally and extends along the track longitudinal axis from the rear end to the front end, wherein the first and second track parts are mounted to one another and rest against one another along a contact plane spanned by the track longitudinal axis and a wing thickness direction, wherein the third roller element is mounted to the first track part and the fourth roller element is mounted to the second track part.

12. An aircraft comprising the wing according to claim 1.

13. A leading edge high lift assembly for a wing of an aircraft, the leading edge high lift assembly comprising a slat, and a connection assembly configured to moveably connect the slat to a main wing of the wing of the aircraft such that the slat is movable, relative to the main wing, between a retracted position and at least one extended position, wherein the connection assembly comprises an elongate slat track that extends along a track longitudinal axis between a front end and a rear end, and an intermediate portion is between the front end and rear end, wherein the front end and/or the intermediate portion of the elongate slat track is configured to be mounted to the slat, wherein the rear end and/or the intermediate portion of the elongate slat track is configured to be mounted to the main wing by a roller bearing such that the elongate slat track is movable along the track longitudinal axis, wherein the roller bearing is configured to engage a guide rail mounted to the main wing, and the roller bearing includes a first roller bearing unit mounted to the rear end of the elongate slat track and configured to engage the guide rail, wherein the guide rail comprises an upper rail portion over an upper portion of the slat track and a lower rail portion beneath a lower portion of the slat track, wherein the guide rail comprises a longitudinal slot in the upper rail portion and/or in the lower rail portion, wherein the connection assembly comprises an actuation device configured to be mounted to the main wing and configured to attach to the elongate slat track, wherein the actuation device is configured to move the elongate slat track and the slat between the retracted position and the at least one extended position, and wherein the actuation device is configured to extend into the longitudinal slot of the guide rail to rotatably attach to the elongate slat track.

14. The leading edge high lift assembly according to claim 13, wherein the actuation device includes a drive arm having a first end section rotatably mounted to the main wing to rotate about a drive axis fixed relative to the main wing and the drive arm extends into the elongated slot where a second end section of the drive arm is rotatably attached to the elongate slat track.

15. The leading edge high lift assembly according to claim 13, wherein the actuation device comprises a rotating drive arm that is configured to be mounted to the main wing and rotatably driven about a drive axis fixed relative to the main wing, and the drive arm is configured to extend into the longitudinal slot and rotatably connect to the elongate slat track.

* * * * *